J. B. CYPERT.
ATTACHMENT FOR AUTOMOBILES OR ANY OTHER DESIRED VEHICLES.
APPLICATION FILED JAN. 13, 1916.
1,195,786. Patented Aug. 22, 1916.
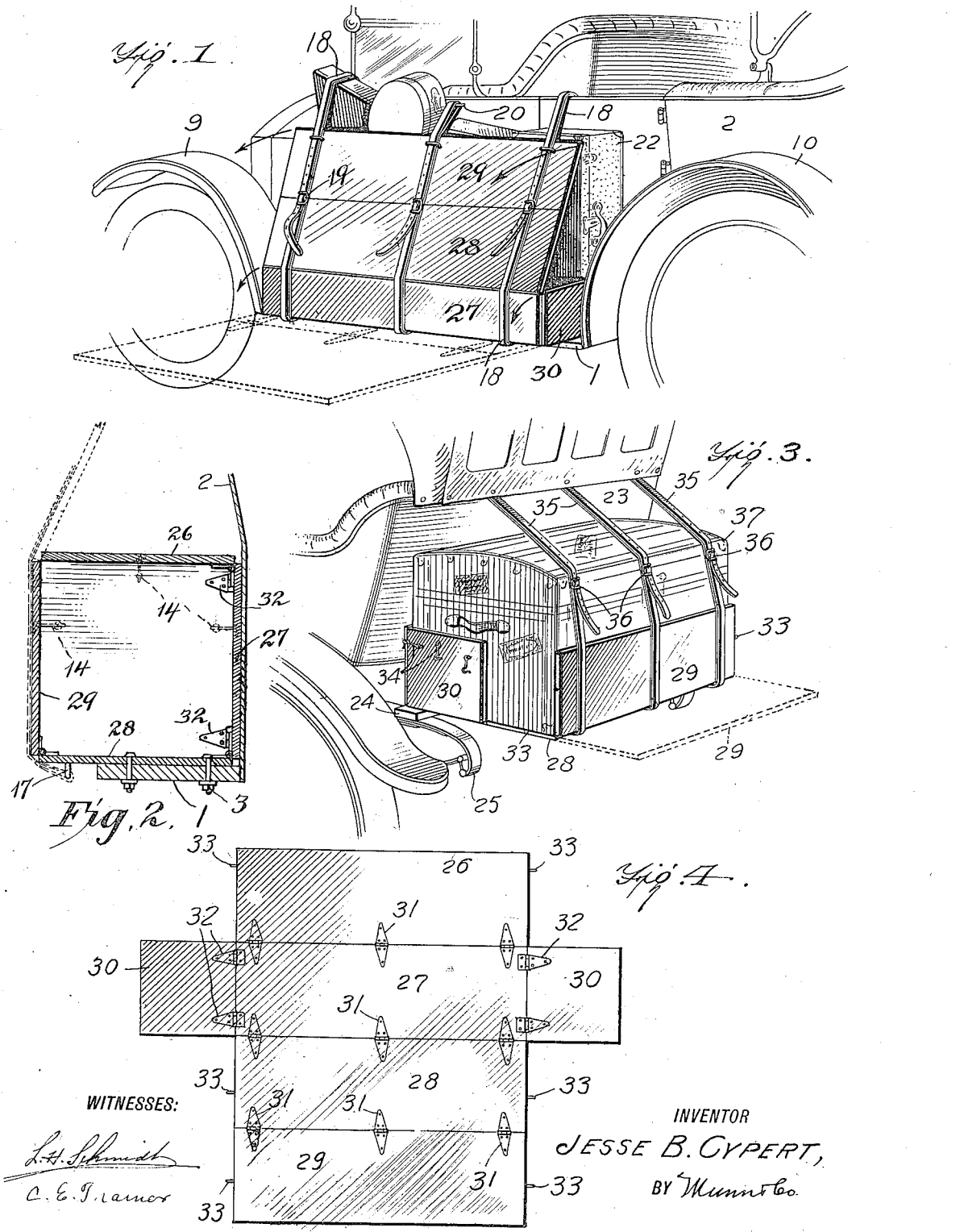
WITNESSES:
INVENTOR
JESSE B. CYPERT,
BY Munn & Co.
ATTORNEYS

UNITED STATES PATENT OFFICE.

JESSE BUNDY CYPERT, OF FROST, TEXAS.

ATTACHMENT FOR AUTOMOBILES OR ANY OTHER DESIRED VEHICLES.

1,195,786. Specification of Letters Patent. Patented Aug. 22, 1916.

Application filed January 13, 1916. Serial No. 71,901.

*To all whom it may concern:*

Be it known that I, JESSE B. CYPERT, a citizen of the United States, and a resident of Frost, in the county of Navarro and State of Texas, have invented a new and useful Improvement in Attachments for Automobiles or Any other Desired Vehicles, of which the following is a specification.

My invention is an improvement in attachments for automobiles, and the invention has for its object to provide an attachment of the character specified, which may be formed into a closed receptacle having a lid which may be fastened in place or which may be folded outward into a holder for a trunk for instance, or for assorted and various articles of luggage, and wherein the attachment is permanently attached to the automobile or may be removed if desired, and which may be arranged either at the side step of the vehicle or in rear of the vehicle, and which may be folded outwardly into a plane surface forming a table or the like.

In the drawings: Figure 1 is a perspective view of the improvement shown in connection with the side step of an automobile as a carrier for various articles of luggage, Fig. 2 is a transverse vertical section, Fig. 3 is a view similar to Fig. 1, showing another position of the parts, and Fig. 4 is a top plan view of the construction shown in Fig. 3 in plane condition.

The embodiment of the invention shown in the drawings is shown in connection with the side step 1 and the body 2 of an automobile, the attachment being connected to the side step by bolts and nuts 3.

The attachment consists of four similar sections 26, 27, 28 and 29, and two similar end sections 30. The sections 26, 27, 28 and 29 are arranged side by side and are hinged together at their adjacent edges by strap hinges 31, three hinges being used in the present instance to connect each section with the adjacent section. The sections 30 are hinged to the ends of the section 27 by hinges 32, a pair of hinges being used for connecting each section to the section 27. The sections 26, 28, 29 have eyes 33 at their ends, and the sections 30 have hooks 34 for engaging the eyes.

The attachment may be arranged as shown in Figs. 1, 2 or 3. As shown in Fig. 1, the attachment may be formed into an open box with the walls 28 and 29 as a species of hood or guard at the outer side of the luggage, and a number of articles 22 may be arranged within the open box so formed. As shown in Fig. 2, the several sections may be formed into a closed receptacle, while as shown in Fig. 3 the attachment may be arranged at the rear of the vehicle with the section 27 resting on the cross bar 24, and with the strapping 35 arranged between the rear seat and the attachment. In Fig. 1 the straps are connected with the side of the vehicle in the manner shown in Fig. 2.

The attachment is arranged as shown in Fig. 3 with the section 27 resting on the cross bar 24 and straps 35 are connected with the section 27 at the under side thereof and with the rear seat as shown, the straps being doubled and having their ends connected by buckles 36. The section 27 in Fig. 3 is the bottom section, and the several sections may be folded into a closed receptacle with the section 29 as the top and the hooks 34 are so arranged that all of the parts may be held together in the closed condition shown in Fig. 2. In addition the several sections 26, 27, 28 and 29 may be folded out flat into plane condition as shown in Fig. 4 in which condition the device may be used as a table. The attachment may be used to support a trunk 37 as shown in Fig. 3, in which instance the sections 27 and 28 constitute the bottom while the sections 26 and 29 constitute the sides. Preferably screws are made use of to connect the section 27 to the cross bar 24. The improvement may be made from wood of suitable dimensions or from metal or any other suitable material, and may be suitably painted or ornamented to correspond with the painting of the vehicle. It will be understood that the attachment in either case may be of any desired dimensions. When the device is used as shown in Fig. 1, the straps 35 are arranged as shown.

I claim:—

An attachment for automobiles, comprising a box or case consisting of top and bottom walls of the same size and similar form, similar side walls, and similar end walls, the side and end walls being hinged to the bottom to fold into position perpendicular thereto or into the same plane, and the top being hinged to one of the said walls, and hooks on the end walls and eyes on the end and side walls for engagement by the hooks, said attachment being adapted for connection with the vehicle, and the bottom wall having loops and straps engaging the loops and adapted for connection at their upper ends to the vehicle.

JESSE BUNDY CYPERT.